United States Patent [19]
Zumbach

[11] Patent Number: 5,895,894
[45] Date of Patent: Apr. 20, 1999

[54] BALANCE

[75] Inventor: Melchior Zumbach, Volketswil, Switzerland

[73] Assignee: Mettler-Toledo GmbH, Greifensee, Switzerland

[21] Appl. No.: 08/837,372

[22] Filed: Apr. 17, 1997

[30] Foreign Application Priority Data

Jul. 5, 1996 [CH] Switzerland .................. 1685/96

[51] Int. Cl.⁶ .................. G01G 21/28; G01G 23/10; G01G 3/08
[52] U.S. Cl. .................. 177/180; 177/185; 177/211; 177/229; 73/863.634; 73/863.639
[58] Field of Search .................. 177/180, 185, 177/211, 229; 73/863.634, 863.639

[56] References Cited

U.S. PATENT DOCUMENTS

| | | | |
|---|---|---|---|
| 4,196,784 | 4/1980 | Suzuki et al. | 177/211 |
| 4,509,610 | 4/1985 | Hayashi | 177/211 |
| 4,804,053 | 2/1989 | Nordstrom | 177/211 |
| 4,957,177 | 9/1990 | Hamilton et al. | 177/211 |

FOREIGN PATENT DOCUMENTS

| | | |
|---|---|---|
| 1774653 | 3/1975 | Germany . |
| 4220810 | 3/1996 | Germany . |

*Primary Examiner*—Hezron E. Williams
*Assistant Examiner*—Randy W. Gibson
*Attorney, Agent, or Firm*—Friedrich Kueffner

[57] ABSTRACT

A balance includes a weighing cell which is surrounded by an elastic tubular bellows or a soft-elastic hose without ribs and is protected against the penetration of dust and water, wherein one end of the bellows or hose is attached to the stationary end of the weighing cell and the other end of the bellows is attached to the load-receiving deflectable end of the weighing cell. At least one bending-stiff support pipe which surrounds the weighing cell in the area of the bellows or hose is placed in the interior of the bellows or hose.

13 Claims, 2 Drawing Sheets

BALANCE

BACKGROUND OF THE INVENTION

1. Field of the Invention

The present invention relates to a balance with a weighing cell which is surrounded by an elastic tubular bellows and is protected against the penetration of dust and water, wherein one end of the bellows is attached to the stationary end of the weighing cell and the other end of the bellows is attached to the load-receiving deflectable end of the weighing cell.

2. Description of the Related Art

Balances are not only used in dry rooms which contain a small amount of dust, but also in industrial plants and manufacturing plants, such as butcher stores, slaughter houses, chemical plants, etc. Particularly in plants of the food industry, regulations require frequent cleaning of all machines and devices and, consequently, also of the balances, with a certain liquid, such as water. This cleaning takes place in many cases with a high pressure cleaning apparatus at whose nozzle tip pressures of up to 150 bars may occur.

Accordingly, sealing units for balances have already been proposed which have the purpose of preventing the penetration of spray water into the measuring cell. In a balance disclosed in U.S. Pat. No. 4,957,177, the weighing or measuring cell is placed in a bellow pipe of metal. The ends of the bellow pipe are attached to the stationary part of the weighing cell, on the one hand, and to the load-receiving, deflectable part, on the other hand. This known bellows protects the weighing cell without problems against the penetration of dust and liquids. However, the configuration of this known bellows requires that the wall thickness of the bellows is very thin, so that the bellows has a soft-elastic behavior and, thus, the influence on the weighing result, for example, due to hysteresis, is kept as low as possible.

Bellow pipes of steel having very thin walls can be manufactured economically only with small diameters. However, these types of bellows have additional disadvantages. Thus, further processing of the guide members is required after the assembly in order to avoid errors due to eccentric loads. This means that the weighing cell becomes more expensive or can only be used in balance constructions in which the eccentric load is compensated in another manner. Moreover, the manufacturing costs for a bellows of metal are very high, particularly when it is of a stainless material.

It is also known in the art to use a rubber bellows instead of a bellows of metal. Such a rubber bellows has the necessary soft elasticity and, in addition, can be manufactured inexpensively. However, the rubber bellows has the disadvantage that its resistance against the hard jet of a high pressure cleaning apparatus is very low and, therefore, the service life of the rubber bellows is short. Moreover, a bellows made of rubber very quickly buckles inwardly under the influence of the water jet and may be damaged by the edges of the measuring cell. In addition, the bellows may not return into its initial position by itself. The buckling of the bellows into bistable positions additionally changes the bypass force emanating from the bellows and influencing the weighing result.

DE-C2-42 20 810 discloses a load receiving means with a beam-shaped weighing cell which is provided with a wire strain gauge arrangement. For damping the vibrations of the balance, the stationary part and the deflectable part of the measuring cell are connected to a tubular metal bellows which surrounds a rod projecting from one end of the weighing cell and a tube which projects from other end of the measuring cell and concentrically surrounds the rod. This bellows is filled with oil as a damping medium. Together with the parts which protrude into each other, i.e., the rod and the tube, the desired damping is achieved by the volume-constant configuration of the metal bellows. The bellows does not surround the measuring cell, but is located within or between the two guide members which extend parallel to each other and connect the two ends of the weighing cell. Consequently, the weighing cell itself and the wire strain gauges mounted thereon are not protected against external influences.

DE-C3-17 74 653 discloses a support means for a bridge of an electromechanical weigh bridge in which the measuring cell is protected against the penetration of moisture and dirt by means of two elastic bellows and a metal pipe piece arranged between the two bellows. There are no measures taken against buckling of the bellows which are not identified in detail. Cleaning of the measuring cell by means of a high pressure cleaning apparatus is rarely carried out in a weighbridge.

SUMMARY OF THE INVENTION

Therefore, it is the primary object of the present invention to provide a balance in which the measuring cell is protected by a soft-elastic bellows which can be manufactured inexpensively, wherein the effectiveness of the bellows is not impaired by high pressure cleaning.

In accordance with the present invention, a balance is provided which includes a weighing cell surrounded by an elastic tubular bellows and protected against the penetration of dust and water, wherein one end of the bellows is attached to the stationary end of the weighing cell and the other end of the bellows is attached to the load-receiving deflectable end of the weighing cell and, wherein at least one bending-stiff support pipe which surrounds the weighing cell in the area of the bellows is placed in the interior of the bellows.

A support means, for example, a support pipe or a grid pipe, arranged at a small distance from the inner diameter of the bellows does not have any influence on the weighing result of the balance; however, the support means supports the bellows having a thin wall and preferably made of rubber or a similar material when cleaning liquid impinges on the bellows from a high pressure cleaning apparatus and prevents buckling of the bellows. However, the support means additionally protects the bellows against damage because an overextension of the bellows is prevented since it rests on the support pipe.

The support pipe is only connected to one of the ends of the weighing cell and, consequently, has no influence on the weighing result. The support pipe can be easily fastened to the weighing cell or to cup-shaped members surrounding the ends of the weighing cell. The cup-shaped members are fastened to the ends of the weighing cell by suitable fastening means and each cup-shaped member supports an end of the bellows at its end facing the center of the weighing cell. The end of the bellows can be connected to the ends of the cup-shaped members by means of known means such as clamps, rings or the like.

The radial strength of the rubber bellows against external forces is increased by providing radially inwardly projecting beads or ribs at the interior of the rubber bellows and integrally connected to the bellows.

The various features of novelty which characterize the invention are pointed out with particularity in the claims

3 annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
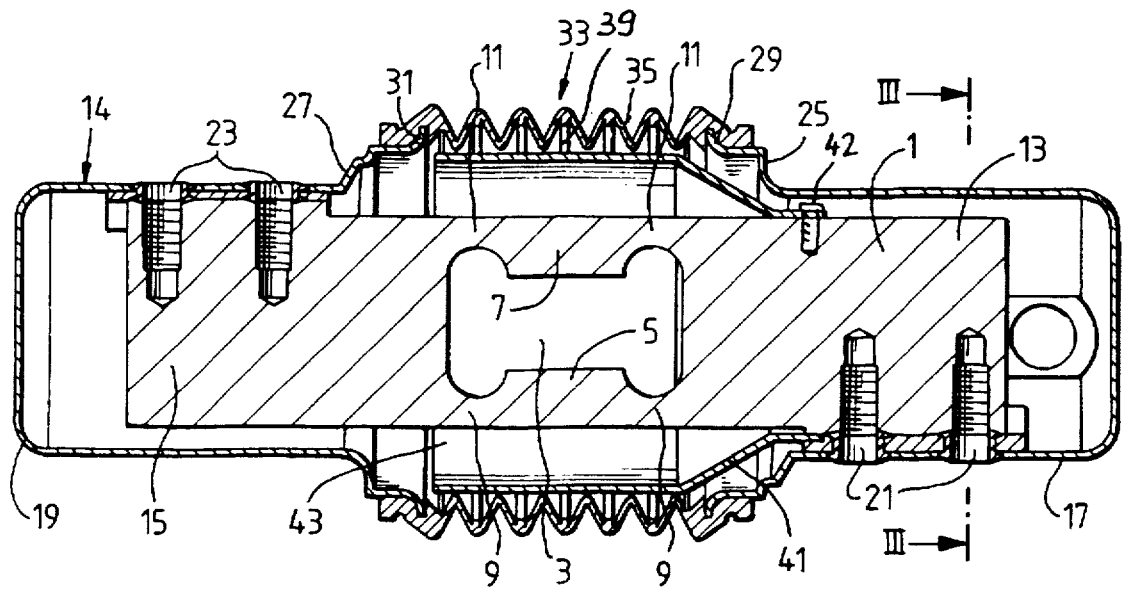
FIG. 1 is a vertical longitudinal sectional view of a measuring cell.

FIG. 1 of the drawing shows a measuring cell 1 of conventional construction, as it is also disclosed in the prior art references discussed herein above.

The measuring cell 1 is composed of a metal block which has in the center thereof a cutout 3 whose geometric configuration defines a lower guide member 5 and an upper guide member 7, wherein the guide members 5 and 7 are connected through two bending points 9 and 11 to the stationary end 13 and to the load-receiving movable end 15, respectively. For clarity's sake, the drawing does not show the balance frame to which the stationary part 13 is attached, nor the load-receiving means with the weighing dish which is placed on the load-receiving end.

The measuring cell is completely surrounded by a sheathing 14 to protect against dust and spray water. The sheathing 14 includes two cup-shaped members 17 and 19 which surround the load-receiving end 15 and the stationary end 13, respectively, and which are connected to the ends by means of fastening means, such as screws. FIG. 1 only shows the holes 21, 23 provided for the screws. The two cup-shaped members 17 and 19 are preferably manufactured of stainless steel by deep-drawing and have flared edges 25 and 27, respectively, at the ends directed toward the middle of the measuring cell 1.

The two flared edges 25, 27 each form a flange 29, 31, respectively, which have the purpose of supporting the ends of a soft-elastic, thin-walled bellows 33. The two ends of the rubber bellows 33 have a substantially greater wall thickness than the walls 35 located between the ends, so that a problem-free circumferential sealing effect is achieved between the bellows 33 and the flanges 29, 31. The bellows 33 is fastened to the cup-shaped members 17, 19 by means of clamps, not shown in the drawing. Of course, the connection can also be effected by gluing.

Figure 4:
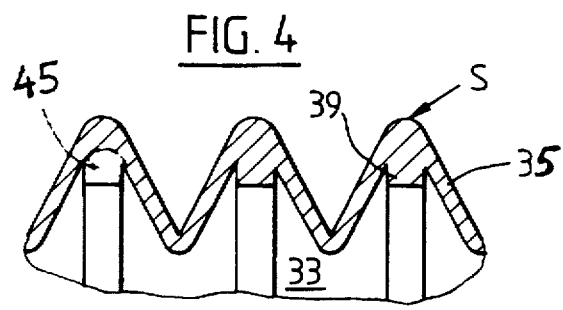
FIG. 4 is a partial sectional view, on a larger scale, of the bellows surrounding the measuring cell.
Figure 5:
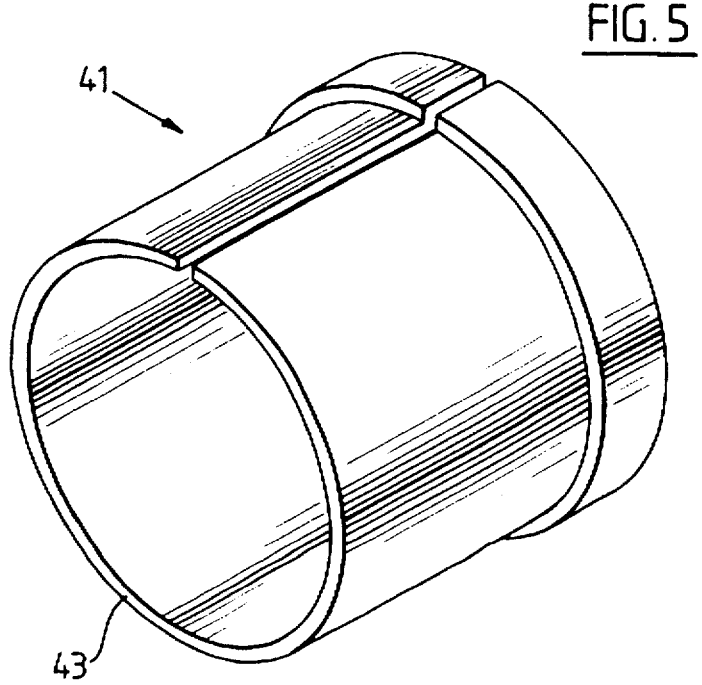
FIG. 5 is a perspective view of a support pipe.

For radially stiffening the bellows 33, inwardly directed ribs or webs 39 extending circumferentially on the inner sides of the walls 35 of the bellows 33 may be formed at the peripheral crowns S of the walls 35. Alternatively, rings 45 of synthetic material or metal may be placed in the bellows 33 as shown in FIG. 4.

A support pipe 41 which extends over the axial length of the bellows 33 is placed on the stationary part 13 of the measuring cell 1, for example, by means of a screw 42 or another suitable fastening means. A small clearance exists between the outer side of the pipe and the inner crowns of the walls 35 of the bellows 33. The end 43 of the support pipe 41 fastened in a cantilevered manner is not supported; consequently, the support pipe 41 does not impair the measuring cell 1 or the load-receiving part 15, as is clear from FIG. 1.

Of course, the support pipe 41 can also be fastened to the load-receiving part 15 of the measuring cell 1 or to one of the two cup-shaped members 17 or 19 or may be monolithically integrated with one of the cup-shaped members 17 or 19.

Figure 2:
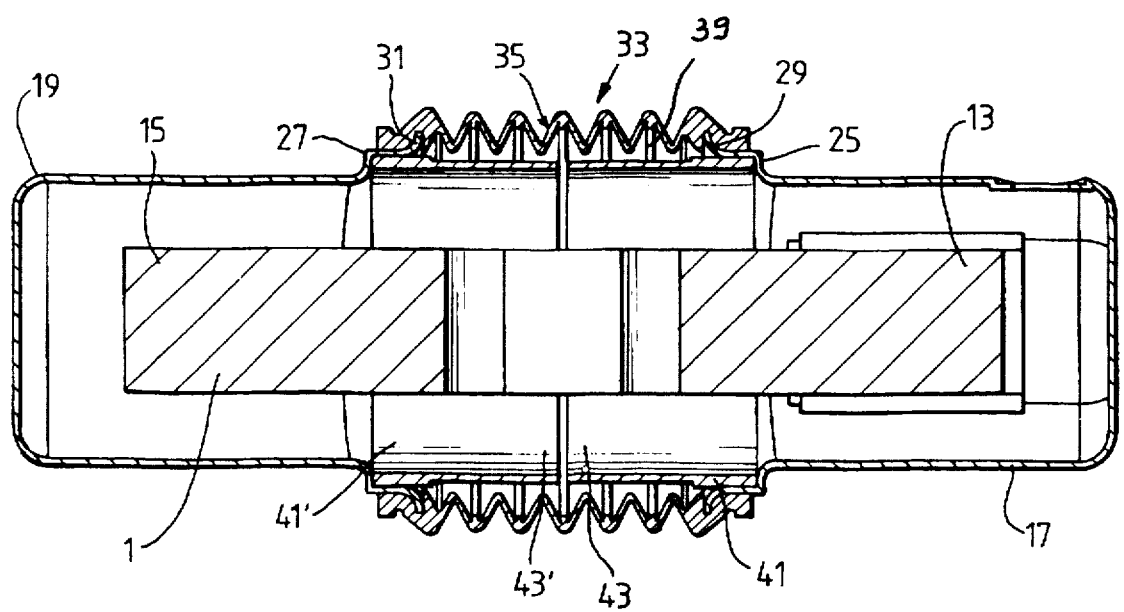
FIG. 2 is a horizontal longitudinal sectional view of the measuring cell of FIG. 1.
Figure 3:
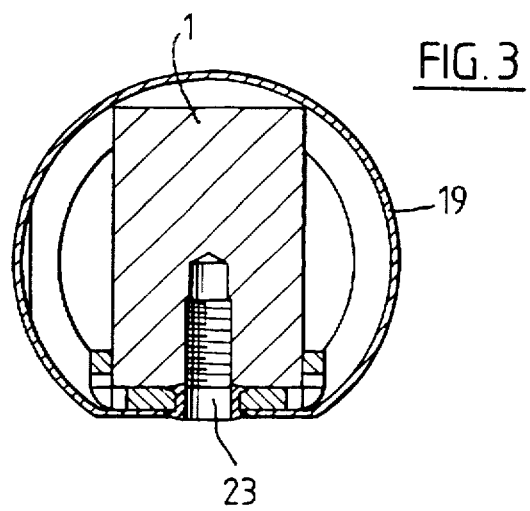
FIG. 3 is a sectional view taken along sectional line III—III of FIG. 1.

As shown in FIG. 2 of the drawing, two support pipes 41, 41' are attached to the cup-shaped members 17 and 19, respectively, wherein the ends 43, 43' of the support pipes 41, 41' are located at a distance opposite each other and do not impair the free movement of the measuring cell 1. The two support pipes 41, 41' may also have different diameters and the ends 43, 43' may concentrically overlap.

As shown in the drawing, the support pipes 41, 41' are pipes which are not perforated. Alternatively, the support pipes may also be made of perforated or slotted sheet metal or of sheet metal having a grid structure.

The cross-sections of the support pipes 41, 41' of the cup-shaped members 17, 19 and of the bellows 33 may be round or polygonal.

The component for effecting the liquid-tight connection between the two cup-shaped members 17, 19 has consistently been referred to as bellows hereinabove. Of course, in a simplified embodiment, the bellows may be replaced by a bending-elastic hose.

The invention is not limited by the embodiments described above which are presented as examples only but can be modified in various ways within the scope of protection defined by the appended patent claims.

I claim:

1. A balance comprising a weighing cell having a first stationary end and load-receiving deflectable second end, an elastic tubular bellows surrounding the weighing cell for protecting against penetrating dust and water, the bellows having an interior and a length, further comprising a bending-stiff support pipe surrounding the weighing cell in the interior of the bellows and extending at least over a portion of the length of the bellows.

2. The balance according to claim 1, further comprising cup-shaped members surrounding the first and second ends of the weighing cells, wherein the bellows has ends, the ends of the bellows being fastened to the cup-shaped members.

3. The balance according to claim 1, wherein the support pipe is fastened to one of the first and second ends of the weighing cell.

4. The balance according to claim 2, wherein the support pipe is fastened to one of the two cup-shaped members.

5. The balance according to claim 1, wherein the support pipe comprises two support pipe portions, wherein one of the support pipe portions each is fastened to the first and second ends of the weighing cell.

6. The balance according to claim 2, wherein the support pipe comprises two support pipe portions, and wherein each support pipe portion is fastened to one of the two cup-shaped members.

7. The balance according to claim 6, wherein at least one of the support pipe portions is monolithically integrated in one of the cup-shaped members.

8. The balance according to claim 1, wherein the support pipe has an outer circumferential surface, and wherein inwardly directed crowns of the bellows are located at a distance from an outer circumferential surface of the support pipe.

9. The balance according to claim 1, wherein the bellows has outwardly facing crowns, and wherein inwardly directed circumferential ribs are mounted on inner sides of the crowns of the bellows.

10. The balance according to claim 1, wherein the bellows has outwardly facing crowns, and wherein rings of synthetic material or metal are mounted on inner sides of the crowns of the bellows.

11. The balance according to claim 2, wherein the bellows, the cup-shaped members and the at least one support pipe have a round cross-section.

12. The balance according to claim 2, wherein the bellows, the cup-shaped members and the at least one support pipe have a polygonal cross-section.

13. A balance comprising a weighing cell having a first stationary end and a load-receiving deflectable second end, a soft-elastic hose without ribs surrounding the weighing cell for protecting against penetrating dust and water, the hose having an interior and a length, further comprising a bending-stiff support pipe surrounding the weighing cell in the interior of the hose and extending at least over a portion of the length of the hose.

* * * * *